United States Patent
Hsu et al.

(10) Patent No.: US 11,289,735 B2
(45) Date of Patent: Mar. 29, 2022

(54) ELECTROLYTE COMPOSITION AND METHOD OF FABRICATING SAME, AND ENERGY STORAGE DEVICE COMPRISING ELECTROLYTE COMPOSITION

(71) Applicant: NATIONAL CHENG KUNG UNIVERSITY, Tainan (TW)

(72) Inventors: Shih-ting Hsu, Tainan (TW); Hsisheng Teng, Tainan (TW); Sheng-shu Hou, Tainan (TW); Yu-hsien Tseng, Tainan (TW); Bo-hsiung Wu, Tainan (TW); Subramani Ramesh, Tainan (TW); Thanh Binh Tran, Tainan (TW); Thi Tuyet Hanh Nguyen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 82 days.

(21) Appl. No.: 16/202,129

(22) Filed: Nov. 28, 2018

(65) Prior Publication Data

US 2020/0168948 A1 May 28, 2020

(51) Int. Cl.
*H01M 10/0565* (2010.01)

(52) U.S. Cl.
CPC ............ *H01M 10/0565* (2013.01); *H01M 2300/0082* (2013.01); *H01M 2300/0091* (2013.01)

(58) Field of Classification Search
CPC ..... H01M 10/0565; H01M 2300/0091; H01M 2300/0082
See application file for complete search history.

(56) References Cited

U.S. PATENT DOCUMENTS

| | | | | |
|---|---|---|---|---|
| 2013/0157122 | A1* | 6/2013 | Tsai | H01M 10/056 429/189 |
| 2015/0214571 | A1* | 7/2015 | Yamaguchi | H01M 10/052 427/80 |
| 2016/0190641 | A1* | 6/2016 | Lee | C08F 220/28 429/303 |
| 2018/0208768 | A1* | 7/2018 | Rhee | C08G 77/28 |
| 2018/0226679 | A1* | 8/2018 | Pan | H01M 10/054 |

FOREIGN PATENT DOCUMENTS

TW    I453972 B    9/2014

OTHER PUBLICATIONS

Chen,Chian Fu A New Highly Conductive Organic-Inorganic Hybrid Electrolyte Based on Co-condensation of Di-ureasil and Ethylene Glycol-containing Alkoxysilane.

\* cited by examiner

*Primary Examiner* — Milton I Cano
*Assistant Examiner* — Jenna Shulman
(74) *Attorney, Agent, or Firm* — Mark M. Friedman (57) ABSTRACT

An electrolyte composition, a method of fabricating the same, and an energy storage device with the electrolyte composition are provided. The method of fabricating an electrolyte composition has steps of: mixing a modified polyoxyethylene-based material and a siloxane-based material in a solvent to form a mixture in which a tail end of a group of the modified polyoxyethylene-based material has an amine group; and heating the mixture at a temperature ranging from 50 to 60° C. for a time ranging from 3 to 5 hours for obtaining an electrolyte composition, where the electrolyte composition is formed by bonding the amine group of the modified polyoxyethylene-based material to the siloxane-based material. The electrolyte composition enables conductive ions to conduct in an electrolyte easily.

2 Claims, 5 Drawing Sheets

ELECTROLYTE COMPOSITION AND METHOD OF FABRICATING SAME, AND ENERGY STORAGE DEVICE COMPRISING ELECTROLYTE COMPOSITION

FIELD OF DISCLOSURE

The present disclosure relates to energy storage, and more particularly to an electrolyte composition and a method of fabricating the same, and an energy storage device comprising the electrolyte composition.

BACKGROUND OF DISCLOSURE

In recent years, energy storage devices (such as batteries) have been widely used in a variety of electronic products or electric vehicles. Therefore, many studies focus on improving performance, energy density, and security of the energy storage devices.

However, there is still room for improvement in electrical properties of conventional lithium batteries. Therefore, it is necessary to provide a lithium battery to further improve the conventional lithium batteries.

SUMMARY OF DISCLOSURE

An object of the present disclosure is to provide an electrolyte composition and a method of fabricating the same, and an energy storage device comprising the electrolyte composition. A modified polyoxyethylene-based material and a siloxane-based material are heated to produce a crosslinking reaction for forming the electrolyte composition. The electrolyte composition has a polyoxyethylene polymer segment which is straightened by the crosslinking reaction, which can reduce crystallinity of the polyoxyethylene and provide an additional transmission channel of conductive ions (for example, lithium ions), so that the conductive ions can be easily conducted in electrolyte.

To achieve the above object, the present disclosure provides a method of fabricating an electrolyte composition, comprising steps of: mixing a modified polyoxyethylene-based material and a siloxane-based material in a solvent to form a mixture, where a tail end of a group of the modified polyoxyethylene-based material has an amine group; and heating the mixture at a temperature ranging from 50 to 60° C. for a time ranging from 3 to 5 hours for obtaining an electrolyte composition, wherein the electrolyte composition is formed by bonding the amine group of the modified polyoxyethylene-based material to the siloxane-based material.

In one embodiment of the present disclosure, the method further comprises a step of adding a lithium ion composition to the electrolyte composition after the step of obtaining the electrolyte composition.

In one embodiment of the present disclosure, the modified polyoxyethylene-based material comprises a block copolymer in a form of polyoxypropylene-polyoxyethylene-polyoxypropylene.

In one embodiment of the present disclosure, the siloxane-based material comprises at least one of polyhedral oligomeric silsesquioxane (POSS) and a derivative thereof.

In one embodiment of the present disclosure, the modified polyoxyethylene-based material is formed by modifying a polyoxyethylene material, wherein the polyoxyethylene material comprises at least one of polyoxyethylene and a derivative thereof.

In another aspect, the present disclosure provides an electrolyte composition fabricated by the method of fabricating the electrolyte composition described above.

In a further aspect, the present disclosure provides an energy storage device, comprising an electrolyte composition fabricated by the method of fabricating the electrolyte composition described above.

In one embodiment of the present disclosure, the energy storage device comprises at least one of a lithium battery and a capacitor.

In one embodiment of the present disclosure, the energy storage device further comprises a hollow housing, an anode, a cathode, a separator, and a liquid electrolyte. The anode is disposed in the hollow housing. The cathode is disposed in the hollow housing. The separator is disposed between the anode and the cathode. The liquid electrolyte is filled between the anode and the separator and filled between the cathode and the separator, wherein the liquid electrolyte comprises a lithium ion composition. At least one of the anode, the cathode, and the separator comprises the electrolyte composition.

In one embodiment of the present disclosure, the energy storage device further comprises a hollow housing, an anode, a cathode, and a solid-state electrolyte. The anode is disposed in the hollow housing. The cathode is disposed in the hollow housing. The solid-state electrolyte is disposed between the anode and the cathode, wherein at least one of the anode, the cathode, and the solid-state electrolyte comprises the electrolyte composition.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

Figure 1:
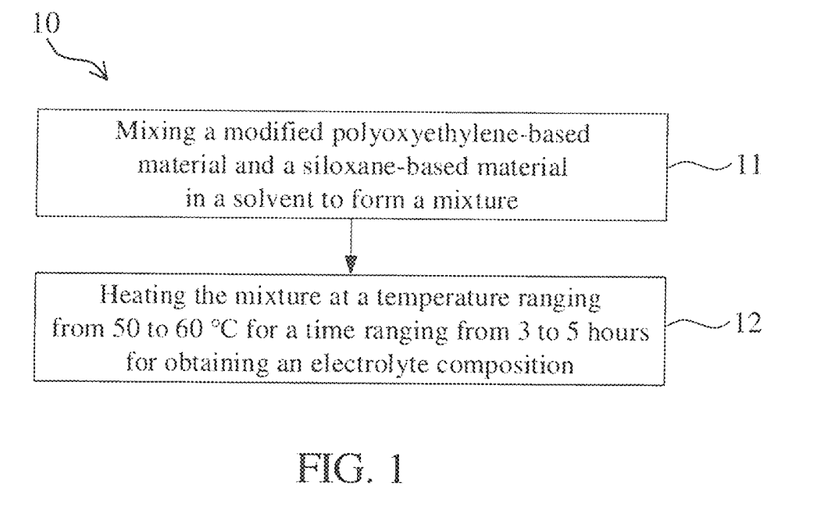
FIG. 1 shows a flowchart of a method of fabricating an electrolyte composition according to an embodiment of the present disclosure.

Referring to FIG. 1, a method 10 of fabricating an electrolyte composition in an embodiment of the present disclosure comprises steps 11 and 12 of: mixing a modified polyoxyethylene-based material and a siloxane-based material in a solvent to form a mixture, where a tail end of a group of the modified polyoxyethylene-based material has an amine group (step 11); and heating the mixture at a temperature ranging from 50 to 60° C. for a time ranging from 3 to 5 hours for obtaining an electrolyte composition, wherein the electrolyte composition is formed by bonding the amine group of the modified polyoxyethylene-based material to the siloxane-based material (step 12). Details of the implementation and principles of the above-described steps of embodiments will be described in detail below.

The method 10 of fabricating an electrolyte composition according to an embodiment of the present disclosure has a step 11 of mixing a modified polyoxyethylene-based material and a siloxane-based material in a solvent to form a mixture, where a tail end of a group of the modified polyoxyethylene-based material has an amine group. In the step 11, the modified polyoxyethylene-based material is mainly modified by a polyoxyethylene-based material such that a modified group of the polyoxyethylene-based material has an amine group at the tail end. In an example, the modified polyoxyethylene-based material can be formed by copolymerization of a polyoxypropylene-based having an $NH_2$ functional group with the polyoxyethylene-based material.

In an embodiment, the polyoxyethylene-based material includes, for example, at least one of polyoxyethylene and a derivative thereof. In an embodiment, the modified polyoxyethylene-based material comprises a block copolymer in a form of polyoxypropylene-polyoxyethylene-polyoxypropylene (PPO-PEO-PPO). It is noted that such block copolymers in the form of PPO-PEO-PPO have good mechanical properties and high safety properties (such as flame retardancy). It is worth mentioning that, for the above block copolymer, the polyoxyethylene segment mainly serves as a main structure of the modified polyoxyethylene-based material. The polyoxypropylene segment has an ability to dissociate a salt and form a complex compound. Further, the polyoxypropylene segment itself is an amorphous polymer, which contributes to conduction of conductive ions (for example, lithium ions).

The block copolymers in the form of PPO-PEO-PPO can be, for example, represented by a formula (1):

$$(PO)_a\text{-}(EO)_b\text{—}(PO)_c \quad (1)$$

In the formula (1), EO represents an ethylene oxide unit ($—CH_2CH_2O—$), PO represents an propylene oxide unit ($—CH_2CH(CH_3)O—$), and each of a, b and c represent an integer of 1 or more than 1 (generally 2 or more than 2). In one embodiment, a sum of a and c can be between 2 and 1000, preferably between 5 and 500, and more preferably between 10 and 200. In another embodiment, b in formula (1) can be between 2 and 200, preferably between 5 and 100, and more preferably between 10 and 50.

In a specific example, the modified polyoxyethylene-based material can be, for example, represented by formula (2) or formula (3):

(2)

(3)

A sum of a and c in the formula (2) is 6, and b is 39.

In an embodiment, the siloxane-based material comprises at least one of polyhedral oligomeric silsesquioxane (POSS) and a derivative thereof. In a specific example, the polyhedral oligomeric silsesquioxane in an embodiment can be, for example, represented by formula (4):

(4)

In one embodiment, a mixing ratio (weight ratio) of the modified polyoxyethylene-based material to the siloxane-based material is, for example, between 6:1 and 15:1, such as 7:1.8:1, 9:1, 10:1, 11:1, 12:1, 13:1, or 14:1.

The method 10 of fabricating an electrolyte composition according to an embodiment of the present disclosure has a step 12 of heating the mixture at a temperature ranging from 50 to 60° C. for a time ranging from 3 to 5 hours for obtaining an electrolyte composition, wherein the electrolyte composition is formed by bonding the amine group of the modified polyoxyethylene-based material to the siloxane-based material. In the step 12, a modified polyoxyethylene-based material and a siloxane-based material are heated to produce a crosslinking reaction for forming the electrolyte composition. The electrolyte composition has a polyoxyethylene polymer segment which is straightened by the crosslinking reaction, which can reduce crystallinity of the polyoxyethylene and provide an additional transmission channel of conductive ions (for example, lithium ions), so that the conductive ions can be easily conducted in electrolyte.

It is mentioned that since the conductive ions are transmitted through an amorphous phase of the polymer, if the crystallinity of the polyoxyethylene is lowered by the above cross-linking reaction, electrical properties of an energy storage device using the electrolyte composition can be improved.

In a specific example, the electrolyte composition can be fabricated, for example, in the following manner. 0.5 g of the composition of the formula (3) and 0.043 g of the composition of the formula (4) are mixed in a solvent (for example, at least one of tetrahydrofuran and dimethylformamide) to form a mixture. Next, the mixture was heated at substantially 55° C. for about 4 hours to obtain an electrolyte composition of the following formula (5).

(5)

In the formula (5), R is as shown in a following formula (6).

(6)

A sum of a and c in the formula (6) is 6, and b is 39.

In one embodiment, the electrolyte composition can be used as a composition of a lithium battery. In a specific example, after the step of obtaining the electrolyte composition, a lithium ion component (for example, at least one of lithium bistrifluoromethylsulfonimide (LITFSI), LiPF6, LiClO4, LiSO4, and LiBF4) can be added to the electrolyte composition to form a composition as a part of a lithium battery. In one embodiment, a molar ratio of a molar number of the polyoxyethylene block ([EO]) of the modified polyoxyethylene-based material to the lithium ion molar number of the lithium ion composition ([Li$^+$]) is, for example, 11:1 to 20:1 (for example, 15:1).

In another aspect, the electrolyte composition in one embodiment of the present disclosure can be fabricated by the method of fabricating the electrolyte composition as each of the above embodiments. The electrolyte composition can be, for example, at least one of a solid electrolyte and a ceramic electrolyte.

In a further aspect, an energy storage device in an embodiment of the present disclosure can comprise an electrolyte composition, wherein the electrolyte composition can be fabricated by a method of fabricating the electrolyte composition as in the above embodiments. In an embodiment, the energy storage device comprises, for example, at least one of a lithium battery and a capacitor.

In an embodiment, the electrolyte composition can be coated or disposed, for example, in various components of the energy storage device to improve electrical properties of the energy storage device.

Figure 2:
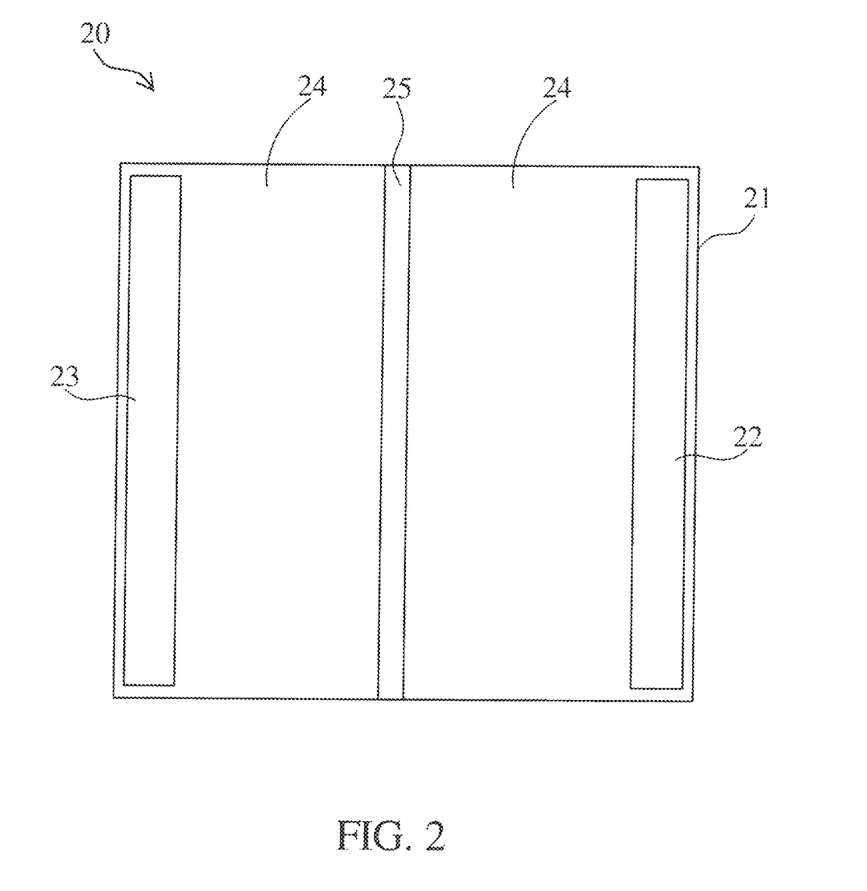
FIG. 2 shows a schematic diagram of an energy storage device according to an embodiment of the present disclosure.

Referring to FIG. 2, FIG. 2 shows a schematic diagram of an energy storage device 20 according to an embodiment of the present disclosure. The energy storage device 20 includes a hollow housing 21, an anode 22, a cathode 23, a liquid electrolyte 24, and a separator 25. The hollow housing 21 is mainly used to package the anode 22, the cathode 23, the liquid electrolyte 24, and the separator 25. In one embodiment, the anode 22 can be formed of at least one of LiCoO$_2$, ternary materials (such as lithium nickel manganese cobalt oxide (Li(Ni$_x$Mn$_y$Co$_z$)O$_2$), where x+y+z=1; Li(Ni$_x$Mn$_y$Co$_z$)O$_2$ can be referred to NMC), and LiFePO$_4$. In another embodiment, the cathode 23 can be formed of one of graphite, lithium metal, or the like. In a further embodiment, the separator 25 is disposed between the anode 22 and the cathode 23. The separator 25 can be used to avoid a direct electrical contact between the anode 22 and the cathode 23. Further, the separator 25 can ensure that the positively charged ions and the negatively charged ions in the liquid electrolyte 24 can be transferred. In another embodiment, the liquid electrolyte 24 is filled between the anode 22 and the separate membrane 25 and filled between the cathode 23 and the separate membrane 25. In one embodiment, the liquid electrolyte 24 can include a lithium ion composition, such as at least one of LiPF$_6$, LiClO$_4$, LiSO$_4$ and LiBF$_4$. At least one of the anode 22, the cathode 23, and the separator 25 comprises the electrolyte composition. In an example, the anode 22 or the cathode 23 can have an adhesive for adhering the anode 22 or the cathode 23 to the hollow housing 21, wherein the adhesive includes the electrolyte composition.

Figure 3:
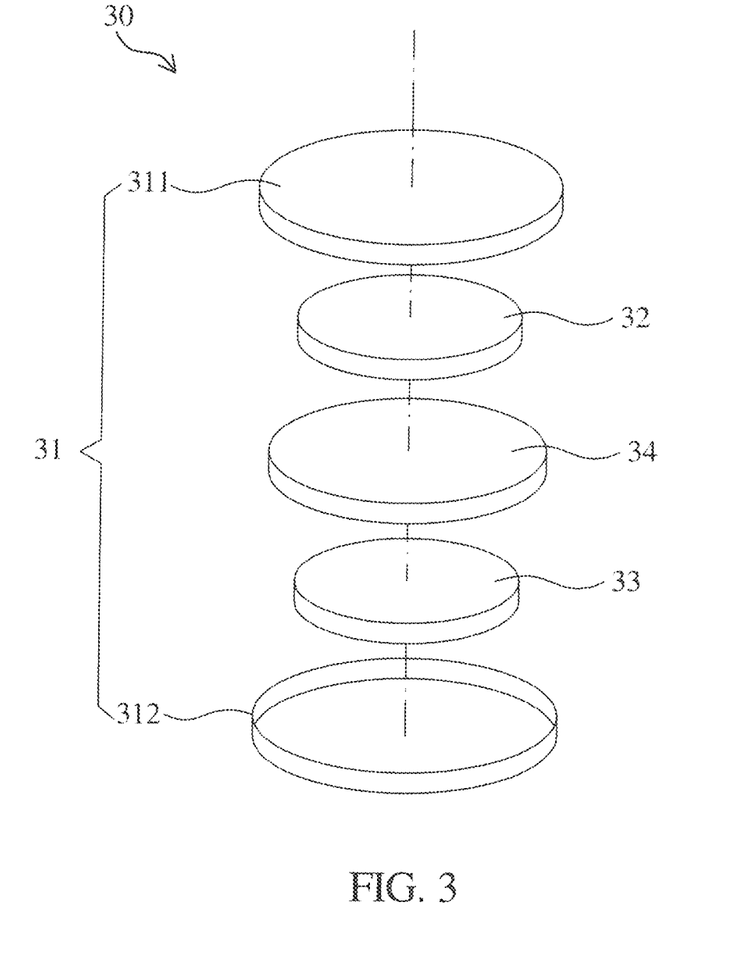
FIG. 3 shows a schematic diagram of an energy storage device according to another embodiment of the present disclosure.

Referring to FIG. 3, FIG. 3 shows a schematic diagram of an energy storage device 30 according to another embodiment of the present disclosure. In another example, the energy storage device 30 can include an upper housing 311, a lower housing 312, an anode 33, a cathode 32, and a solid-state electrolyte 34. The upper housing 311 and the lower housing 312 can constitute a hollow housing 31 used to receive the anode 33, the cathode 32, and the solid-state electrolyte 34. The anode 33 is disposed in the hollow housing 31. In one embodiment, the anode 33 can be formed of at least one of $LiCoO_2$, ternary materials (such as NMC), and $LiFePO_4$. The cathode 32 is disposed in the hollow housing 31. In one embodiment, the cathode 32 can be formed of one of graphite, lithium metal, or the like. The solid-state electrolyte 34 is disposed between the anode 33 and the cathode 32, wherein at least one of the anode 33, the cathode 32, and the solid-state electrolyte 34 comprises the electrolyte composition. In an example, the anode 33 or the cathode 32 can have an adhesive for adhering the anode 33 or the cathode 32 to the hollow housing 31, wherein the adhesive includes the electrolyte composition.

Figure 4:
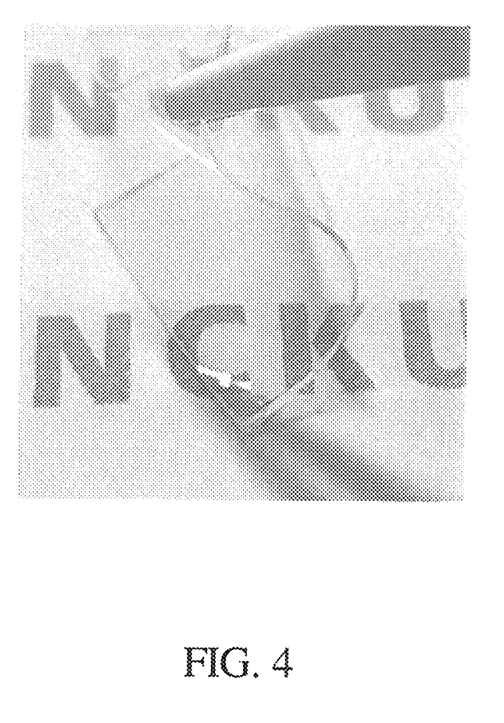
FIG. 4 shows a schematic diagram of an electrolyte composition coated on a substrate according to an embodiment of the present disclosure.

It is to be noted that the electrolyte composition can be coated on an electrode plate (which can be used as an anode or a cathode) or a substrate (which can be used as a separator, as shown in FIG. 4), for example, by using a solution casting method. The solution casting method is generally performed by applying the electrolyte composition onto the electrode plate or the substrate, and then removing the solvent in a vacuum oven to form the electrolyte composition on the electrode plate or the substrate.

In another aspect, the electrolyte composition can also be placed in a container, and then a solvent can be removed in a vacuum oven to form a free standing solid polymer electrolyte (SPE). In one embodiment, since the electrolyte composition has excellent mechanical properties (e.g., flexibility) and the process is simple, the free standing solid polymer electrolyte suitable for commercial production can be formed.

Hereinafter, an effect of the electrolyte composition of the embodiment of the present disclosure which can improve an electric power property will be described.

Figure 5:
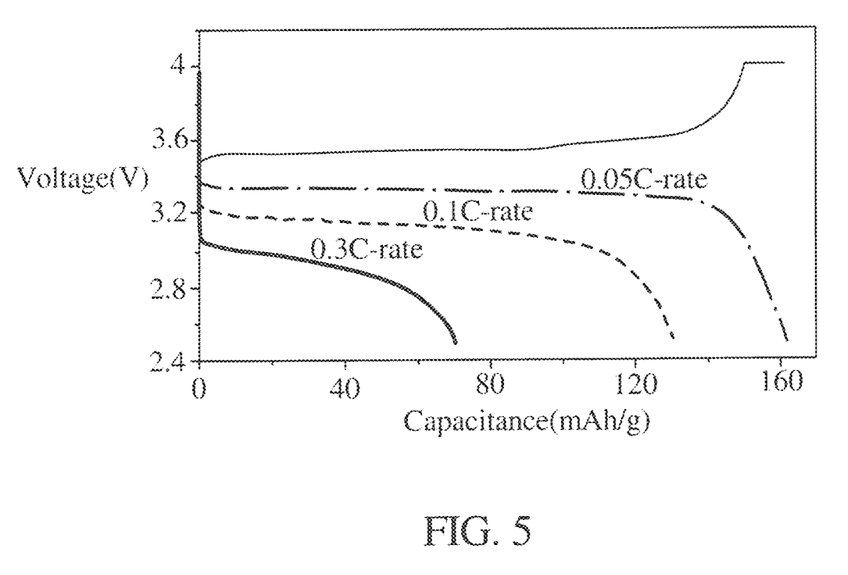
FIG. 5 shows a test result diagram of an electrolyte composition according to an embodiment of the present disclosure.

In a lithium battery, a lithium iron phosphate material is used as a anode, a lithium metal is used as a cathode, and a composition of the formula (5) is used as a solid-state electrolyte. Next, a charge and discharge test is performed on the lithium battery, which is tested at room temperature (about 20 to 25° C.) at a discharge rate of 0.05 C-rate, 0.1 C-rate, and 0.3 C-rate, respectively. The test results are shown in FIG. 5. As can be seen from FIG. 5, when discharging at 0.05 C-rate, a capacitance is 160 mAh/g; when discharging at 0.1 C-rate, a capacitance is 130 mAh/g; and when discharging at 0.3 C-rate, a capacitance is 70 mAh/g.

It is mentioned that the existing solid-state electrolyte polymer for a lithium battery can only be used for a commercially acceptable charge and discharge property at an ambient temperature of 40 to 90° C. In contrast, since the embodiment of the present disclosure causes the electrolyte composition to have a straightened polyoxyethylene polymer segment by a crosslinking reaction, conductive ions can be easily conducted in the electrolyte. Therefore, the lithium battery of the above embodiment can have commercially acceptable charge and discharge properties at room temperature. On the other hand, according to further tests, the lithium battery of the above embodiment can have commercially acceptable charge and discharge properties at an ambient temperature of 10 to 90° C.

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A method of fabricating an electrolyte composition, comprising steps of:

mixing a modified polyoxyethylene-based material and a siloxane-based material in a solvent to form a mixture, where a tail end of a group of the modified polyoxyethylene-based material has an amine group, wherein the modified polyoxyethylene-based material comprises a block copolymer in a form of polyoxypropylene-polyoxyethylene-polyoxypropylene, and the siloxane-based material comprises at least one of polyhedral oligomeric silsesquioxane and a derivative thereof, wherein:

the modified polyoxyethylene-based material is as follows:

wherein a sum of a and c is between 2 and 1000, and b is between 2 and 200; and the siloxane-based material is as follows:

; and heating the mixture at a temperature ranging from 50 to 60° C. for a time ranging from 3 to 5 hours for obtaining an electrolyte composition, wherein the electrolyte composition is formed by bonding the amine group of the modified polyoxyethylene-based material to the siloxane-based material, wherein the electrolyte composition is as follows:

2. The method of fabricating the electrolyte composition according to claim 1, further comprising a step of adding a lithium ion composition to the electrolyte composition after the step of obtaining the electrolyte composition.

* * * * *